(12) United States Patent
Singa et al.

(10) Patent No.: US 10,893,126 B2
(45) Date of Patent: Jan. 12, 2021

(54) METHOD AND APPARATUS FOR PROTOCOL TRANSLATION AND EXCHANGE OF SELECTABLE, CONTEXTUALIZED DATA BETWEEN A SERVER USING A NEXT-GENERATION PROTOCOL AND A LEGACY SERVER

(71) Applicants: SIEMENS AKTIENGESELLSCHAFT, Munich (DE); SIEMENS INDUSTRY, INC., Alpharetta, GA (US)

(72) Inventors: Naveen Kumar Singa, Plainsboro, NJ (US); Anant Kumar Mishra, Charlotte, NC (US); Joseph Kernich, Hanahan, SC (US)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 16/360,554

(22) Filed: Mar. 21, 2019

(65) Prior Publication Data
US 2019/0306279 A1    Oct. 3, 2019

Related U.S. Application Data

(60) Provisional application No. 62/649,768, filed on Mar. 29, 2018.

(51) Int. Cl.
*H04L 29/06* (2006.01)
*G05B 19/418* (2006.01)
*H04L 12/24* (2006.01)

(52) U.S. Cl.
CPC .......... *H04L 69/08* (2013.01); *G05B 19/4186* (2013.01); *H04L 41/0816* (2013.01);
(Continued)

(58) Field of Classification Search
CPC .............. G05B 19/418; G05B 19/4186; G05B 2219/1368; G06F 13/00; G06Q 30/02;
(Continued)

(56) References Cited

U.S. PATENT DOCUMENTS 7,873,825 B2 * 1/2011 Jokela ..................... H04L 61/10
713/153
8,423,608 B2    4/2013 Mahnke
(Continued)

OTHER PUBLICATIONS

Kim, Woonggy and Sung, Minyoung, "Standalone OPC UA Wrapper for Industrial Monitoring and Control Systems", Department of Mechanical and Information Engineering, The University of Seoul, Jul. 25, 2018, 14 pages.

*Primary Examiner* — Robert B Harrell

(57) ABSTRACT

Method and apparatus to provide protocol translation and selectable data exchange in a client/server system are provided. A tag list is extracted from a legacy client device 116 connected to a legacy server 114 using a protocol corresponding to the legacy server. A configuration manager device 120 is used to configure the extracted tag list to obtain a selected tag list excerpt of the extracted tag list. The configuring device is arranged to map the selected tag list excerpt to a configuration adapted for a respective 112 server, and to define contextualization. Server 112 provides industrial automation services using a next-generation protocol, e.g., OPC UA or MTConnect. A tag list is generated to configure server 112. A stream of data points of the selected tag list excerpt of the tag list extracted from the legacy client device is transferred to one or more client devices 124 connected to server 112.

29 Claims, 4 Drawing Sheets

(52) U.S. Cl.
CPC .............. *H04L 67/42* (2013.01); *H04L 69/18* (2013.01); *G05B 2219/31368* (2013.01)

(58) Field of Classification Search
CPC ..... H04L 12/24; H04L 29/06; H04L 29/0809; H04L 29/06027; H04L 29/06047; H04L 29/06068; H04L 29/06095; H04L 29/06462; H04L 29/06523; H04L 29/08072; H04L 29/08117; H04L 41/0806; H04L 41/0816; H04L 41/0846; H04L 41/0853; H04L 47/10; H04L 67/42; H04L 69/08; H04L 69/18
USPC ................................ 709/203, 230, 231, 232
See application file for complete search history.

(56) References Cited

U.S. PATENT DOCUMENTS

| | | |
|---|---|---|
| 9,106,678 B2 | 8/2015 | Elsterer et al. |
| 9,246,894 B2 * | 1/2016 | Gordon ............... H04L 67/1095 |
| 2007/0274312 A1 * | 11/2007 | Salmela ............ H04L 29/12009 370/392 |
| 2013/0070788 A1 | 3/2013 | Deiretsbacher et al. |
| 2014/0123257 A1 * | 5/2014 | Gordon ............... H04L 67/1095 726/7 |
| 2018/0088548 A1 | 3/2018 | Sangi |
| 2018/0224821 A1 | 8/2018 | Lamparter et al. |

* cited by examiner

METHOD AND APPARATUS FOR PROTOCOL TRANSLATION AND EXCHANGE OF SELECTABLE, CONTEXTUALIZED DATA BETWEEN A SERVER USING A NEXT-GENERATION PROTOCOL AND A LEGACY SERVER

This application claims benefit of the Mar. 29, 2018 filing date of application 62/649,768, which is incorporated by reference herein.

BACKGROUND

1. Field

Disclosed embodiments relate generally to the field of automation, such as automation control, and, more particularly, to data exchange techniques useful in a client/server environment in the context of an automation system, and, even more particularly, to method and apparatus to provide protocol translation and exchange of selectable, contextualized data, such as may be exchanged between a server configured to provide industrial automation services using a next-generation protocol, such as Open Platform Communications (OPC) Unified Architecture (UA) protocol or MTConnect protocol, and a legacy server using a protocol other than the next-generation protocol.

2. Description of the Related Art

In the field of computerized automation, there is a need of data communication techniques capable of reliable, secure, and interoperable transport of control and management data. For example, an industrial automation system may involve connectivity of many automation devices to a main communication network backbone. Often, the industrial automation system may involve multi-generational automation devices that may be configured with different protocols, and, consequently, field protocol translation becomes one key consideration to provide seamless data communication among such devices.

For example, an automation device with an older communication stack may have to access a server configured to accept data on a next-generation protocol. Appropriate protocol translation has to be implemented to establish connectivity between such a device and server.

OPC UA and MTConnect are examples of next-generation communication standards rapidly gaining prominence in modern automation systems, such as may be used in automated manufacturing and various other applications, such as automated retail, automated commercial transactions, automated transportation, etc. The foregoing standards enable exchanging control and management of data among distributed automation devices in an automation system. One challenge is to provide seamless connectivity between clients connected to a server using a next-generation protocol and legacy servers that, for example, may use OPC classic protocol (a predecessor of OPC UA protocol) or any protocol other than the next-generation protocol. For one example approach in the context of OPC UA, see technical paper titled "Stand Alone OPC UA Wrapper for Industrial Monitoring and Control Systems" by Woonggy K., and Minoung S., available in IEEE Access 2018 2852792.

BRIEF DESCRIPTION

A disclosed embodiment is directed to a method to provide protocol translation and selectable data exchange in a client/server system between a respective server configured to provide industrial automation services using a next-generation protocol and a legacy server using a protocol other than the next-generation protocol. The method allows extracting a tag list from a legacy client device connected to the legacy server. The method further allows configuring in a configuration manager device the tag list extracted from the legacy client device to obtain a selected tag list excerpt of the tag list from the legacy client device. The configuring may be arranged to map the selected tag list excerpt to a configuration adapted for the respective server. The configuring may be further arranged to define contextualization in the selected tag list excerpt. Based on the selected tag list excerpt mapped with the configuration adapted for the respective server and the defined contextualization, a tag list may be generated for the respective server. The respective server may be configured with the tag list generated for the respective server. The method allows transferring a stream of data points of the selected tag list excerpt of the tag list from the legacy client device to at least one client device connected to the respective server configured to provide industrial automation services using the next-generation protocol.

A further disclosed embodiment is directed to apparatus to provide protocol translation and selectable data exchange in a client/server system between a respective server configured to provide industrial automation services using a next-generation protocol and a legacy server using a protocol other than the next-generation protocol. The apparatus includes a configuration manager device to configure a tag list extracted from a legacy client device connected to the legacy server. The tag list being configured to obtain a selected tag list excerpt of the tag list from the legacy client device and map the selected tag list excerpt to a configuration adapted for the respective server. The tag list being further configured to define contextualization in the selected tag list excerpt. A tag list is generated for the respective server in response to the selected tag list excerpt mapped with the configuration adapted for the respective server and the defined contextualization. The respective server is configured with the tag list generated for the respective server. A buffer is arranged to cyclically store a stream of data points of the selected tag list excerpt of the tag list from the legacy client device. The stream of data points being transferred to at least one client device connected to the respective server configured to provide industrial automation services using the next-generation protocol.

A still further disclosed embodiment is directed to non-transitory computer readable medium encoded with processor executable code that when executed by at least one processor, cause the at least one processor to carry out a method for protocol translation and exchange of selectable, contextualized data in a client server environment between a respective server configured to provide industrial automation services using a next-generation protocol and a legacy server using a protocol other than the next-generation protocol. The executable code may include a routine arranged to extract a tag list from a legacy client device connected to the legacy server. The executable code may further include a routine arranged to configure the tag list extracted from the legacy client device to obtain a selected tag list excerpt of the tag list from the legacy client device. The selected tag list excerpt being mapped to a configuration adapted for the respective server. The selected tag list excerpt being grouped to define contextualization in the selected tag list excerpt. Based on the selected tag list excerpt mapped with the configuration adapted for the respective server and the defined contextualization, a routine arranged to generate a tag list for the respective server. A routine arranged to configure the respective server with the tag list generated for the respective server and a routine arranged to transfer a stream of data points of the selected tag list excerpt of the tag list from the legacy client device to at least one client device connected to the respective server configured to provide industrial automation services using the next-generation protocol.

DETAILED DESCRIPTION

Figure 1:
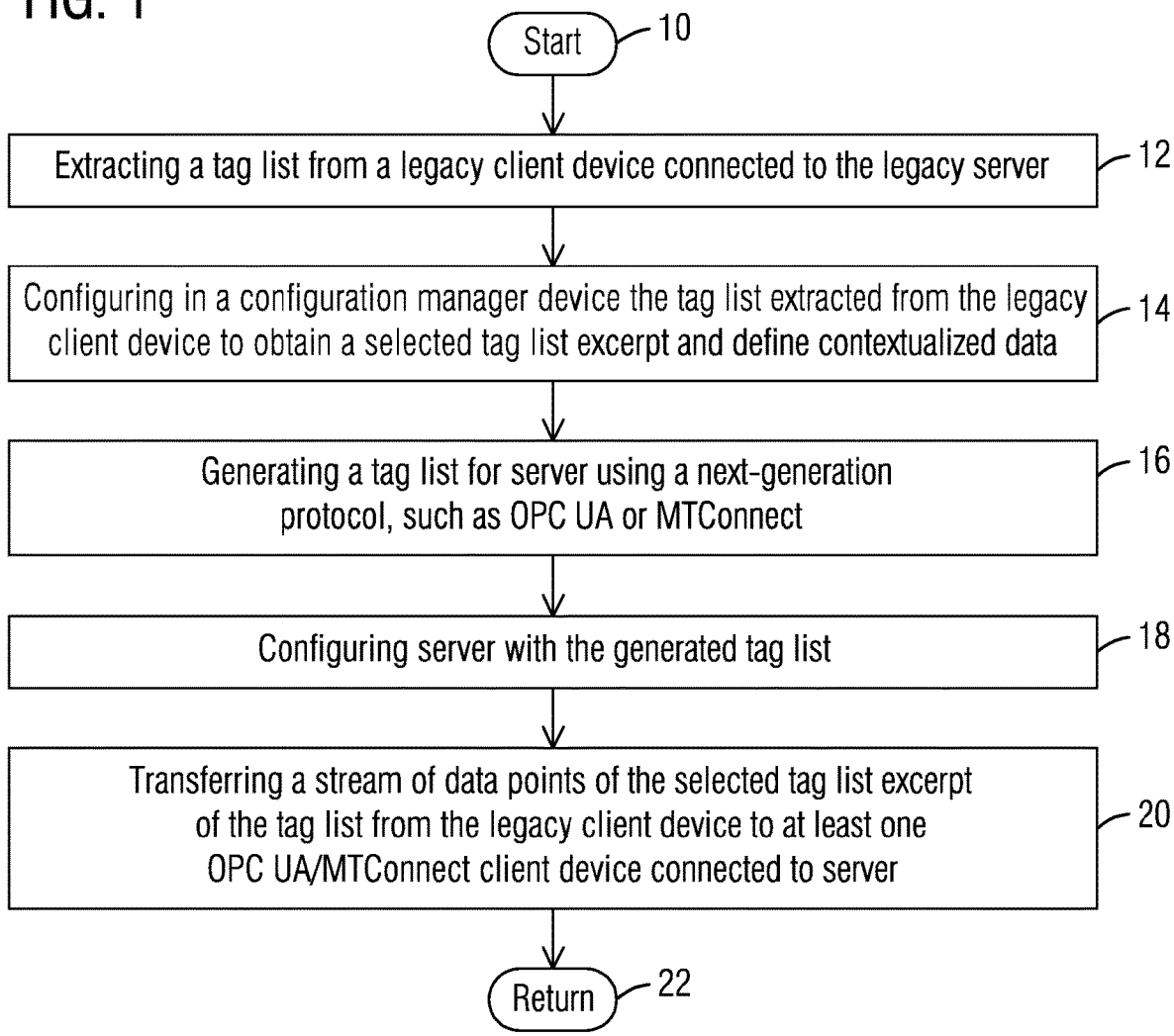
FIG. 1 is a flow chart of one non-limiting embodiment of a disclosed method, as may be used for carrying out protocol translation and selectable data exchange in a client/server environment.

Certain prior art protocol translators purport to map entire data streams from a legacy system environment to a system involving a next-generation protocol, such as mapping entire data streams of OPC Classic data directly to OPC UA data. The present inventors have recognized that any such mapping is generally performed without considering data contextualization, such as offered by OPC UA. The present inventors have further recognized that mapping entire data streams—such as without any flexible data selectivity or data filtering, as could be desired from time-to-time by a given user—could substantially burden the data-managing capability of, for example, an embedded controller.

At least in view of such recognition, disclosed embodiments formulate an innovative approach for cost-effectively and reliably providing protocol translation and selectable data exchange, such as selectively distilling or filtering just data that may be of individualized interest to a respective user in a given application. For example, such data filtering may be effective to reduce load on the controller and may simplify user tasks in the given application, such as extracting data focused on diagnostics of a given issue, or targeted data analytics, etc. Without limitation, disclosed embodiments advantageously allow contextualization to be provided and essentially a client device connected to a server using a next-generation protocol perceives a legacy client device as if such legacy client device was a device operating under the next-generation protocol.

Without limitation, disclosed embodiments may be effective tools in the context of the "Industry 4.0" paradigm and interrelated paradigms, such as "Industrial Internet" and "Digital Factory", collectively conducive to synergistic efficiencies, such as without limitation, advanced connectivity and automation, cloud computing, intelligent sensors, 3D printing, computer-powered processes, intelligent algorithms and 'internet of things' (IoT) services effective to efficiently transform industrial operations.

In the following detailed description, various specific details are set forth in order to provide a thorough understanding of such embodiments. However, those skilled in the art will understand that disclosed embodiments may be practiced without these specific details that the aspects of the present invention are not limited to the disclosed embodiments, and that aspects of the present invention may be practiced in a variety of alternative embodiments. In other instances, methods, procedures, and components, which would be well-understood by one skilled in the art have not been described in detail to avoid unnecessary and burdensome explanation.

Furthermore, various operations may be described as multiple discrete steps performed in a manner that is helpful for understanding embodiments of the present invention. However, the order of description should not be construed as to imply that these operations need be performed in the order they are presented, nor that they are even order dependent, unless otherwise indicated. Moreover, repeated usage of the phrase "in one embodiment" does not necessarily refer to the same embodiment, although it may. It is noted that disclosed embodiments need not be construed as mutually exclusive embodiments, since aspects of such disclosed embodiments may be appropriately combined by one skilled in the art depending on the needs of a given application.

FIG. 1 is a flow chart of one non-limiting embodiment of a disclosed method, as may be used for carrying out protocol translation and selectable data exchange in a client/server environment, such as between a respective server 112 (FIG. 6) configured to provide industrial automation services using a next-generation protocol and a legacy server 114, such as without limitation an OPC DA server, using OPC classic protocol. In the general case, legacy server 114 may be any legacy server using a protocol other than the next-generation protocol, such as without limitation, Modbus RTU EtherNet/IP, Ethernet TCP/IP, Modbus TCP/IP, Profinet, etc. Non-limiting examples of next-generation protocols may be OPC UA, or MTConnect.

Figure 6:
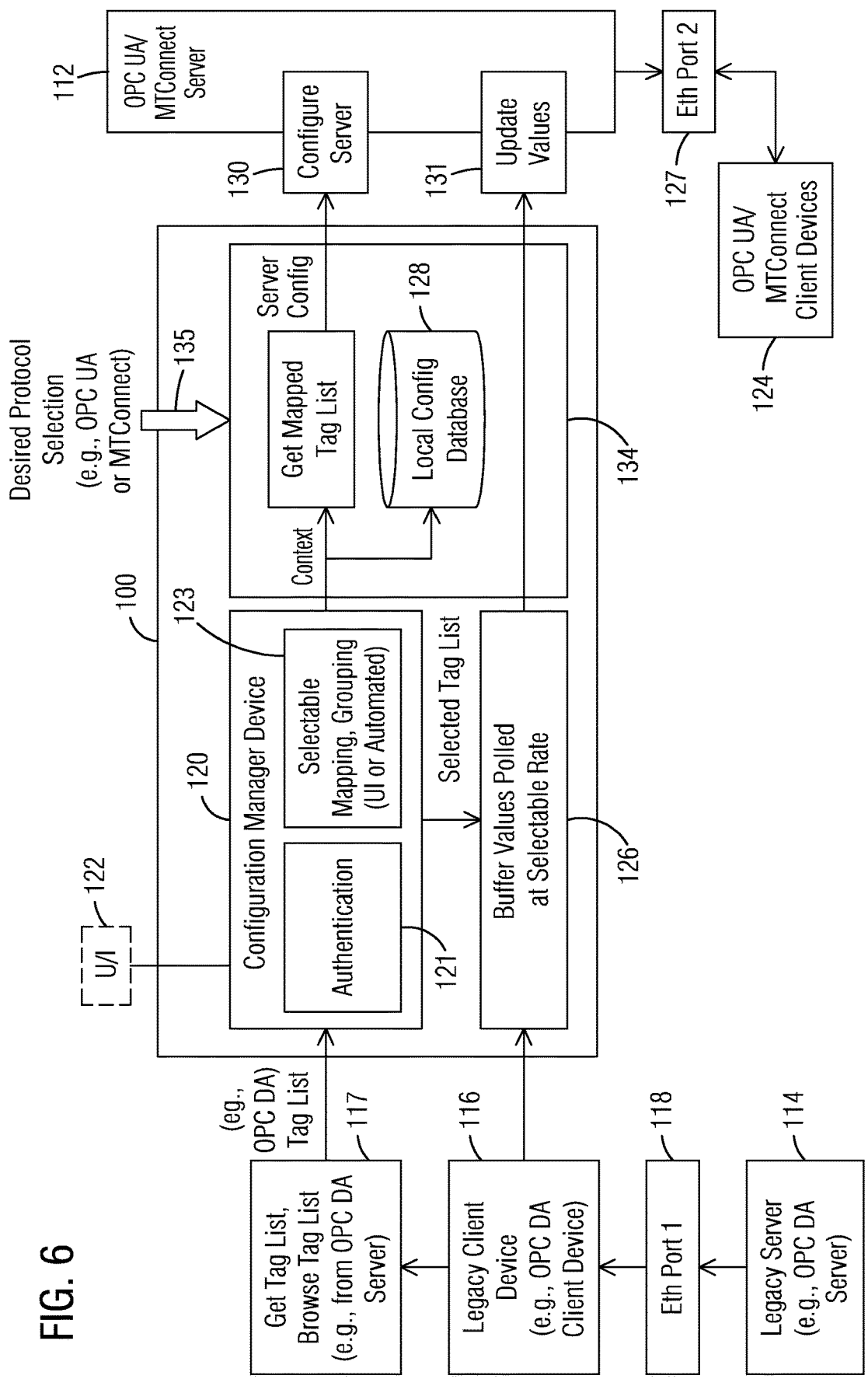
FIG. 6 is a block diagram of one non-limiting embodiment of a disclosed apparatus, as may be used for carrying out protocol translation and selectable data exchange in a client/server environment.

FIG. 6 is a block diagram of one non-limiting embodiment of a disclosed apparatus 100, as may be used for carrying out the disclosed method. Throughout the description below, reference often will be made to elements or functional blocks shown FIG. 6 while concurrently discussing respective flowcharts in connection with the disclosed method.

Subsequent to a start block 10, block 12 in FIG. 1 indicates an act for extracting a tag list (e.g., a complete list of visible tags) from a legacy client device 116 (e.g., OPC DA Client, see also block 117 in FIG. 6), such as without limitation may be connected to a legacy server 114 by way of an ethernet port 118.

Continuing with the flow chart of FIG. 1, block 14 indicates an act for configuring, such as by way of a configuration manager device 120 (FIG. 6), the tag list extracted from legacy client device 116 (e.g., OPC DA Client) to obtain a selected tag list excerpt of the complete tag list extracted from the legacy client device. It will be appreciated that this aspect advantageously offers data selectivity (e.g., data filtering) that may be desired by a given user, which in turn can alleviate load on the controller. The configuring is arranged to map the selected tag list excerpt to a configuration adapted for respective server 112 (FIG. 6).

That is, the respective server configured to provide industrial automation services using the next-generation protocol. The configuring may be further arranged to define contextualization in connection with data of the selected tag list excerpt.

Based on the selected tag list excerpt mapped with the configuration adapted for respective server 112 and the defined data contextualization, block 16 indicates an act for generating a tag list configured for respective server 112. As indicated in block 18 in FIG. 1, (also in block 130 in FIG. 6), this tag list (e.g., including the mapped tags and the defined contextualization) may be used for configuring respective server 112.

In certain embodiments, prior to configuring respective server 112, such as indicated in block 18 of FIG. 1, a validation action of the mapped tagged list may be performed by appropriately qualified personnel, such as without limitation, via remote access. Alternatively, such validation action may be autonomously performed with a machine-trained computerized validator, such as may be trained from historical cases for similar system implementations. That is, the validation action is designed to confirm that the mapped tagged list is indeed appropriate for configuring respective server 112. If the validation action confirms that the mapped tagged list is appropriate for configuring respective server 112, then the flow of acts proceeds to configure respective server 112. If the validation action cannot confirm that the mapped tagged list is appropriate for configuring respective server 112, then a triggering action may trigger generation of a new mapped tag list appropriate for configuring respective server 112.

In one non-limiting embodiment, block 134 may function as a selectable protocol translator configured to perform selectable protocol translation of the selected tag list excerpt in response to a desired user selection. As conceptually represented by arrow 135, depending on the needs of a given application, without limitation, the user could select translation to OPC UA or to MTConnect depending on the specific protocol modality of respective server 112 and client devices 124, such as OPC UA client devices or MTConnect client devices.

Prior to return block 22, block 20 indicates an action for transferring a stream of data points of the selected tag list excerpt of the complete tag list from legacy client device 116 to at least one client device 124, such as without limitation may be connected to respective server 112 by way of a further Ethernet port 127 (FIG. 6).

Figure 2:
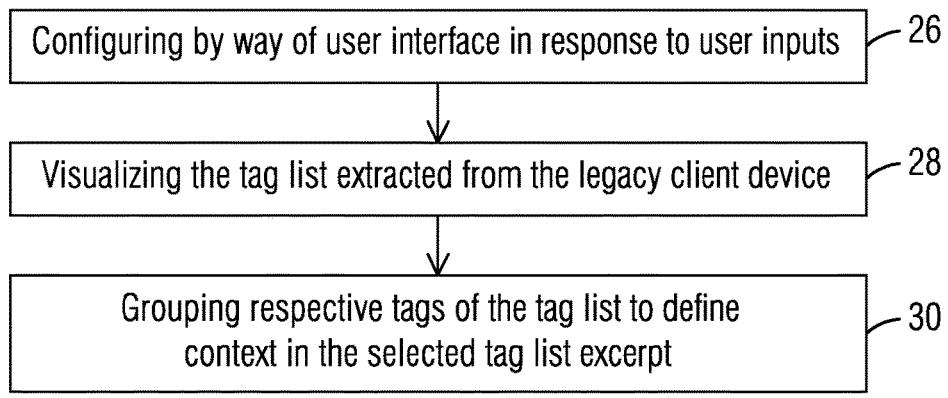
FIG. 2 is a flow chart of one non-limiting embodiment of a tag list configuring aspect of the disclosed method.

FIG. 2 is a flow chart of one non-limiting embodiment of the tag list configuring aspect (e.g., block 14 in FIG. 1) of the disclosed method. In one non-limiting embodiment, block 26 indicates an action regarding such configuring (e.g., selectable mapping, grouping, etc.) to be performed by way of a user interface (U/I) 122 (FIG. 6) in response to user inputs submitted by an appropriately authenticated user. See, for example, authentication block 121 and selectable mapping block 123 in FIG. 6.

One non-limiting construction of U/I 122 may be by way of a Node-RED tool (or similar tool) that can provide a visually intuitive, browser-based flow editor. For example, block 28 in FIG. 2 indicates an action for visualizing the tag list extracted from the legacy client device and, block 30 indicates an action for grouping respective tags of the tag list extracted from the legacy client device to define the contextualization in the selected tag list excerpt. It will be appreciated that in certain embodiments, where contextual relationships may be known a priori, the configuring may be automated in configuration manager device 120.

Figure 7:
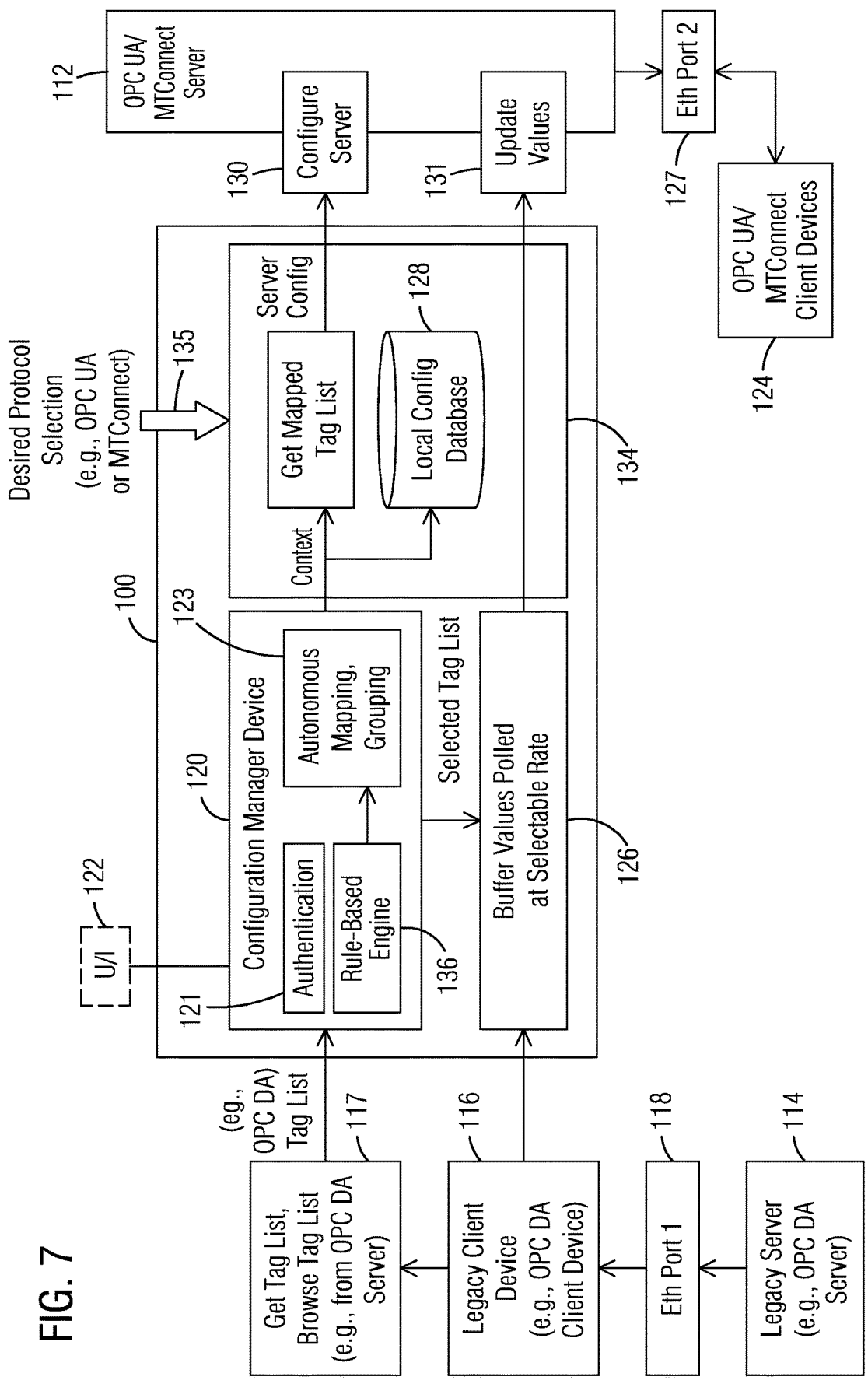
FIG. 7 is a block diagram of another non-limiting embodiment of a disclosed apparatus, as may be used for autonomously carrying out protocol translation and selectable data exchange in a client/server environment.

As shown in FIG. 7, it is contemplated that in certain embodiments configuration manager device 120 may include a rule-based engine 136 responsive to the tag list (e.g., the complete list of visible tags) extracted from legacy client device 116 (e.g., OPC DA Client) to autonomously generate the tag list excerpt of the tag list extracted from the legacy client device. That is, rule-based engine 136 may be configured to autonomously map the tag list extracted from legacy client device 116 in a form suitable for respective server 112. Rule-based engine 136 may be further configured to autonomously determine groupings indicative of data contextualization. Without limitation, rule-based engine 136 may be responsive to the tag list extracted from the legacy client device to autonomously generate the selected tag list excerpt mapped with the configuration adapted for respective server 112 and the defined contextualization.

It will be appreciated that rule-based engine 136 could be used optionally in combination with U/I 122. For example, a user may select a mapping modality where rule-based engine 136 is the device selected to perform the mapping of the tag list extracted from legacy client device 116. Optionally, the user may select another modality where U/I 122 is the device that performs the mapping of the tag list extracted from legacy client device 116 in response to user inputs, as described above.

Figure 3:
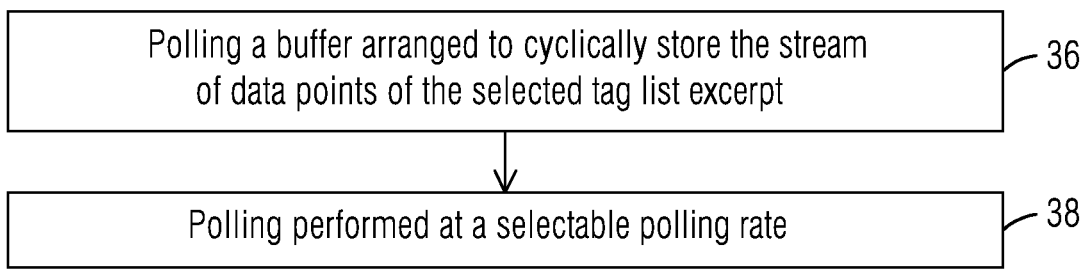
FIG. 3 is a flow chart of one non-limiting embodiment of a data-transferring aspect of the disclosed method.

FIG. 3 is a flow chart of one non-limiting embodiment of the data-transferring aspect (e.g., block 20 in FIG. 1) of the disclosed method. Without limitation, the transferring of the stream of data points (i.e., respective numerical values of such data points) of the selected tag list excerpt may involve polling a buffer 126 (FIG. 6) arranged to cyclically store the stream of data points of the selected tag list excerpt. As indicated in block 38, the polling of buffer 126 may be performed at a selectable polling rate. This polling rate may be tailored based on the needs of a given application to, for example, ensure that the respective values of such data points are appropriately updated in respective server 112. See for example updating block 131 in FIG. 6.

Figure 4:
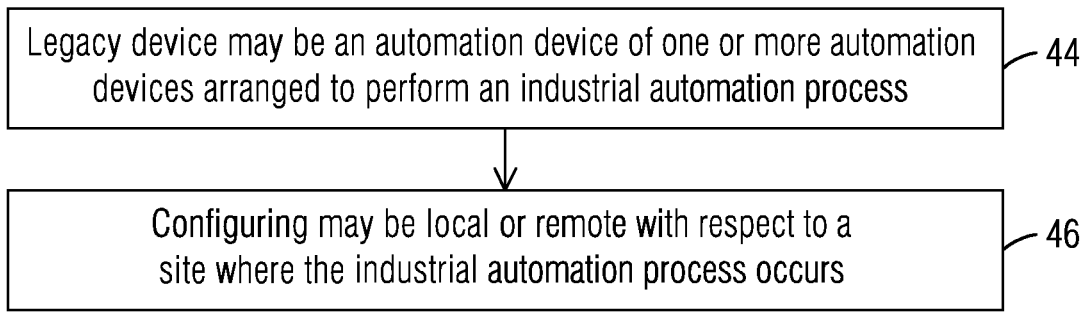
FIG. 4 is a flow chart of alternative embodiments for performing the configuring aspect of the disclosed method.

FIG. 4 is a flow chart of non-limiting alternative embodiments that may be optionally used for performing the configuring aspect of the disclosed method. As indicated in block 44, legacy server 114, e.g., OPC DA server, may be used in an automation process, and legacy client device 116 (e.g., OPC DA Client) may be an automation device of one or more automation devices arranged to perform an automation process (or part of an automation system). As indicated in block 46, the configuring (e.g., block 14 in FIG. 1) may be local or remote with respect to a site where the industrial automation process occurs (or with respect to a location of the automation system).

Without limitation, legacy client device 116 (e.g., OPC DA Client) may be a programmable logic controller (PLC), a programmable automation controller (PAC), a human machine interface (HMI), a supervisory control and data acquisition (SCADA), a manufacturing execution system (WS), an intelligent sensor and a combination of at least two of said automation devices. As would be appreciated by one skilled in the art, an intelligent sensor is adapted to undertake at least some of the processing that would normally take place within the PLC or PAC.

Figure 5:
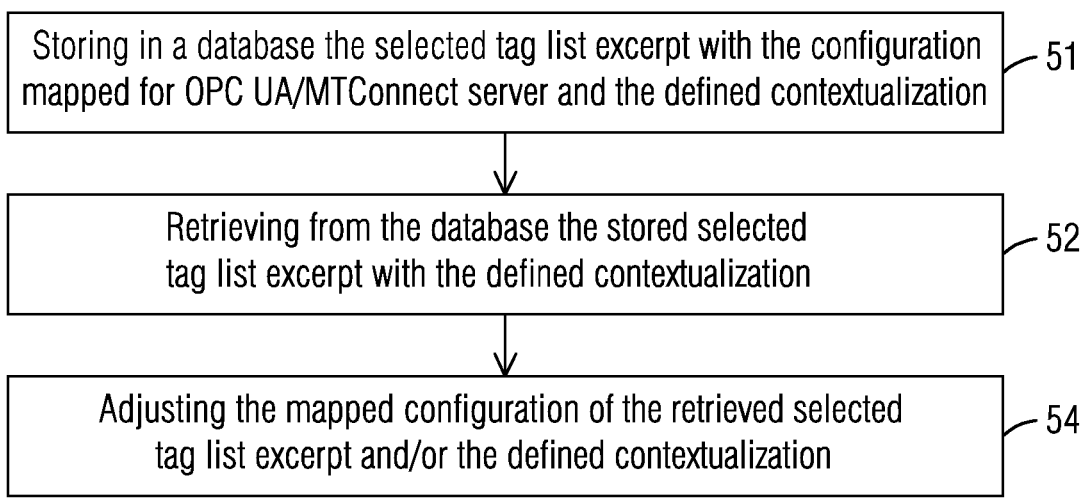
FIG. 5 is a flow chart of one non-limiting embodiment of a configuration-adjusting that may implemented in the disclosed method.

FIG. 5 is a flow chart of one non-limiting embodiment of a configuration-adjusting that may performed in the disclosed method. Block 51 indicates an action for storing in a memory 128 (e.g., a database or any suitable storage device) the selected tag list excerpt with the configuration mapped for respective server 112 and the defined contextualization. Block 52 indicates an action for retrieving from database

128 the stored selected tag list excerpt with the configuration mapped for respective server 112 and the defined contextualization. Block 54 indicates an action for adjusting (e.g., with configuration manager 120 (FIG. 6)) the mapped configuration of the retrieved selected tag list excerpt and/or the defined contextualization to perform a desired data transfer to the at least one client device 124. That is, the user may use this functionality to tweak or fine-tune a previously mapped configuration of the retrieved selected tag list excerpt and/or the defined contextualization information without having to recreate from scratch the mapped configuration and/or the defined contextualization.

In one non-limiting embodiment, disclosed apparatus 100, such as including configuration manager device 120, rule-based engine 136, etc., may be a digital processing system comprising at least one processor (e.g., a microprocessor/CPU). The at least one processor may be configured to carry out various processes and actions described in connection with disclosed embodiments by executing from a memory, computer/processor executable code corresponding to one or more software and/or firmware applications, routines or portions thereof that are programmed to cause the at least one processor to carry out the various processes and actions described in connection with disclosed embodiments. Without limitation, digital processing system could be a local and/or remote system, server, controller, etc. As used herein, a processor corresponds to any electronic device that may be configured via hardware circuits, software, and/or firmware to process data or signals.

As used herein, terms such as "system", "apparatus" and "device" may each encompass hardware, software, or a combination of hardware and software. Thus, for example, a system, apparatus or device may be a process, a process executing on a processor, or a processor. Additionally, a system, apparatus or device may be localized on a single component or distributed across several components.

It is noted that while the disclosure in connection with disclosed embodiments includes a description in the context of a fully functional apparatus and/or respective sequences of acts or actions, those skilled in the art will appreciate that at least portions of the structural and/or operational relationships of disclosed embodiments and/or described actions are capable of being in the form of computer/processor executable code (e.g., software and/or firmware code or programmable instructions) contained within a data store that corresponds to a non-transitory machine-usable, computer-usable, or computer-readable medium in any of a variety of forms (e.g., without limitation, flash drive, SSD, hard drive, ROM, EPROMs, optical discs/drives, databases, etc). The computer/processor executable code may include a routine, a sub-routine, programs, applications, modules, libraries, and/or the like. Further, it should be appreciated that computer/processor executable code may correspond to and/or may be generated from source code, byte code, runtime code, machine code, assembly language, such as Java, JavaScript, Python, Julia, C, C#, C++ or any other form of code that can be programmed/configured to cause at least one processor to carry out the actions and features described herein.

In operation, disclosed embodiments allow cost-effective and reliable protocol translation and selectable data exchange effective to reduce load on the controller. Without limitation, disclosed embodiments advantageously allow such data exchange to be enriched with contextualized information (e.g., semantic context, etc.).

In operation, disclosed embodiments provide methodology and apparatus that in a cost-effective manner offer substantial modularity, scalability, flexibility and reliable interface for protocol translation with contextualization.

While embodiments of the present disclosure have been disclosed in exemplary forms, it will be apparent to those skilled in the art that many modifications, additions, and deletions can be made therein without departing from the scope of the invention and its equivalents, as set forth in the following claims.

What is claimed is:

1. A method to provide protocol translation and selectable data exchange in a client/server system between a respective server configured to provide industrial automation services using a next-generation protocol and a legacy server using a protocol other than the next-generation protocol, the method comprising:
    extracting a tag list from a legacy client device connected to the legacy server;
    configuring in a configuration manager device the tag list extracted from the legacy client device to obtain a selected tag list excerpt of the tag list from the legacy client device, the configuring of the tag list extracted from the legacy client device arranged to map the selected tag list excerpt to a configuration adapted for the respective server, the configuring of the tag list extracted from the legacy client device further arranged to define contextualization in the selected tag list excerpt;
    based on the selected tag list excerpt mapped with the configuration adapted for the respective server and the defined contextualization, generating a tag list for the respective server;
    configuring the respective server with the tag list generated for the respective server; and
    transferring a stream of data points of the selected tag list excerpt of the tag list from the legacy client device to at least one client device connected to the respective server configured to provide industrial automation services using the next-generation protocol.

2. The method of claim 1, wherein the legacy server is used in an automation process, and the legacy client device is an automation device of one or more automation devices arranged to perform the automation process.

3. The method of claim 2, wherein the configuring of the tag list extracted from the legacy client device is local with respect to a site where the automation process occurs.

4. The method of claim 2, wherein the configuring of the tag list extracted from the legacy client device is remote with respect to a site where the automation process occurs.

5. The method of claim 2, wherein the automation device is selected from a group consisting of a programmable logic controller (PLC), a programmable automation controller (PAC), an intelligent sensor, a human machine interface (HMI), a supervisory control and data acquisition (SCADA), a manufacturing execution system (MES), and a combination of at least two of said automation devices.

6. The method of claim 1, wherein the configuring of the tag list extracted from the legacy client device is by way of a user interface in response to user inputs.

7. The method of claim 6, wherein the configuring of the tag list extracted from the legacy client device comprises visualizing the tag list extracted from the legacy client device and grouping respective tags of the tag list extracted from the legacy client device to define the contextualization in the selected tag list excerpt.

8. The method of claim 1, wherein the transferring of respective values of respective data points of the stream of data points of the selected tag list excerpt comprises polling a buffer arranged to cyclically store the stream of data points of the selected tag list excerpt.

9. The method of claim 8, wherein the polling is performed at a selectable polling rate.

10. The method of claim 1, further comprising storing in a database the selected tag list excerpt with the configuration mapped for the respective server and the defined contextualization.

11. The method of claim 10, further comprising retrieving from the database the stored selected tag list excerpt with the configuration mapped for the respective server and the defined contextualization, and adjusting with the configuration manager the mapped configuration of the retrieved selected tag list excerpt and/or the defined contextualization to perform a desired data transfer to the at least one client device.

12. The method of claim 1, wherein the next-generation protocol is selected from a group consisting of an Open Platform Communications (OPC) Unified Architecture (UA) protocol, and an MTConnect protocol.

13. The method of claim 1, wherein the configuring of the tag list extracted from the legacy client device is automated in the configuration manager device.

14. The method of claim 1, wherein the legacy server comprises an OPC Data Access (DA) server.

15. Apparatus to provide protocol translation and selectable data exchange in a client/server system between a respective server configured to provide industrial automation services using a next-generation protocol and a legacy server using a protocol other than the next-generation protocol, the apparatus comprising:
a configuration manager device to configure a tag list extracted from a legacy client device connected to the legacy server, the tag list being configured to obtain a selected tag list excerpt of the tag list from the legacy client device and map the selected tag list excerpt to a configuration adapted for the respective server, the tag list being further configured to define contextualization in the selected tag list excerpt;
wherein a tag list is generated for the respective server in response to the selected tag list excerpt mapped with the configuration adapted for the respective server and the defined contextualization,
wherein the respective server is configured with the tag list generated for the respective server;
a buffer arranged to cyclically store a stream of data points of the selected tag list excerpt of the tag list from the legacy client device, the stream of data points being transferred to at least one client device connected to the respective server configured to provide industrial automation services using the next-generation protocol.

16. The apparatus of claim 15, wherein the legacy server is part of an automation system, and the legacy client device is an automation device of one or more automation devices of the automation system.

17. The apparatus of claim 16, wherein the configuration of the tag list by way of the configuration manager device is local with respect to a site where the automation system is located.

18. The apparatus of claim 16, wherein the configuration of the tag list by way of the configuration manager device is remote from a site where the automation system is located.

19. The apparatus of claim 16, wherein the automation device is selected from a group consisting of a programmable logic controller (PLC), a programmable automation controller (PAC), an intelligent sensor, a human machine interface (HMI), a supervisory control and data acquisition (SCADA), a manufacturing execution system (MES), and a combination of at least two of said automation devices.

20. The apparatus of claim 15, further comprising a database arranged to store the selected tag list excerpt with the configuration mapped for the respective server and the defined contextualization.

21. The apparatus of claim 20, wherein the selected tag list excerpt with the configuration mapped for the respective server and the defined contextualization stored in the database is retrieved from the database, and
wherein the retrieved selected tag list excerpt and/or the defined contextualization is adjusted with the configuration manager to perform a desired data transfer to the at least one client device.

22. The apparatus of claim 15, wherein the next-generation protocol is selected from a group consisting of an Open Platform Communications (OPC) Unified Architecture (UA) protocol, and an MTConnect protocol.

23. The apparatus of claim 15, further comprising a user interface coupled to the configuration manager device to configure the tag list extracted from the legacy client device in response to user inputs.

24. The apparatus of claim 15, wherein the configuration manager device automatically configures the tag list extracted from the legacy client device.

25. The apparatus of claim 15, wherein the buffer is polled at a selectable polling rate to transfer the stream of data points of the selected tag list excerpt to the respective server.

26. The apparatus of claim 15, wherein the legacy server comprises an OPC Data Access (DA) server.

27. The apparatus of claim 15, further comprising a rule-based engine responsive to the tag list extracted from the legacy client device to autonomously generate the selected tag list excerpt mapped with the configuration adapted for the respective server and the defined contextualization.

28. A non-transitory computer readable medium encoded with processor executable code that when executed by at least one processor, cause the at least one processor to carry out a method for protocol translation and exchange of selectable, contextualized data in a client server environment between a respective server configured to provide industrial automation services using a next-generation protocol and a legacy server using a protocol other than the next-generation protocol, the executable code comprising:
a routine arranged to extract a tag list from a legacy client device connected to the legacy server;
a routine arranged to configure the tag list extracted from the legacy client device to obtain a selected tag list excerpt of the tag list from the legacy client device, the selected tag list excerpt being mapped to a configuration adapted for the respective server, the selected tag list excerpt being grouped to define contextualization in the selected tag list excerpt;
based on the selected tag list excerpt mapped with the configuration adapted for the respective server and the defined contextualization, a routine arranged to generate a tag list for the respective server;
a routine arranged to configure the respective server with the tag list generated for the respective server; and
a routine arranged to transfer a stream of data points of the selected tag list excerpt of the tag list from the legacy client device to at least one client device connected to the respective server configured to provide industrial automation services using the next-generation protocol.

29. The non-transitory computer readable medium of claim 28, further comprising routine configured as a rule-based engine responsive to the tag list extracted from the legacy client device to autonomously generate the selected tag list excerpt mapped with the configuration adapted for the respective server and the defined contextualization.

* * * * *